Feb. 15, 1938.                F. FISCHER ET AL                2,108,766
                       DISTANCE MEASURING MEANS AND METHOD
                              Filed March 31, 1933
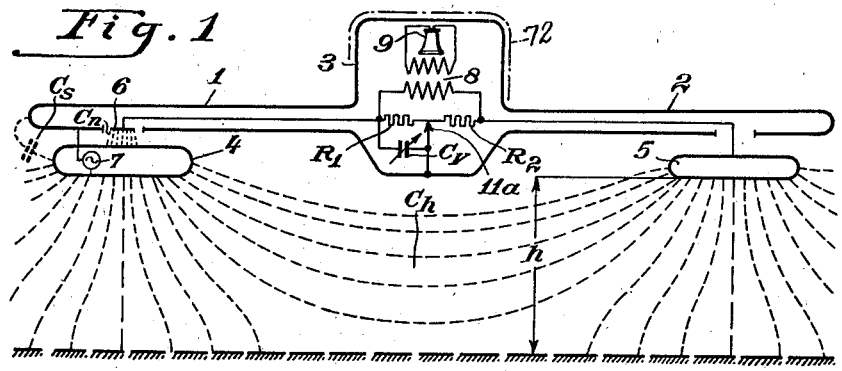
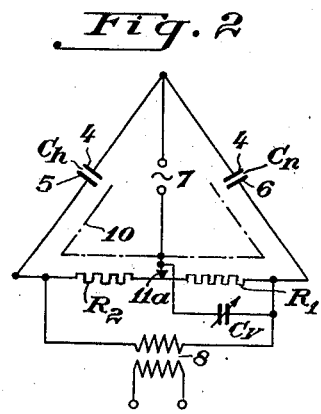
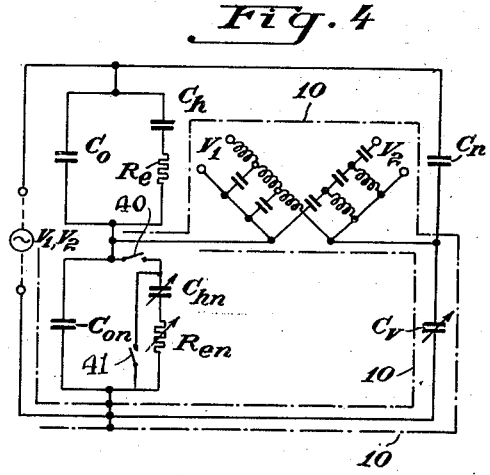
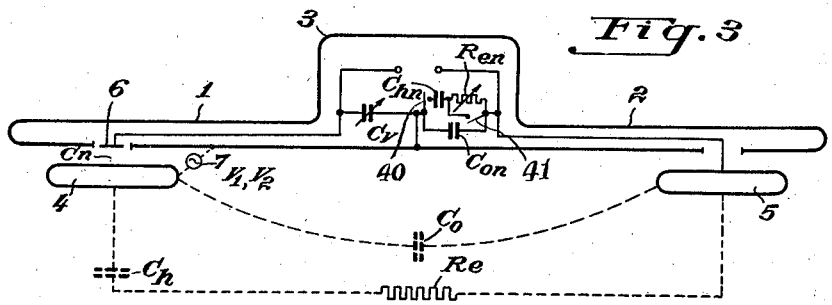
Inventors
Fritz Fischer
Ludwig Rellstab
by
Lorcas & Kehlenbeck
Attorneys Patented Feb. 15, 1938

2,108,766

UNITED STATES PATENT OFFICE 2,108,766

DISTANCE MEASURING MEANS AND METHOD

Fritz Fischer, Berlin-Charlottenburg, and Ludwig Rellstab, Berlin-Nikolassee, Germany, assignors to Siemens & Halske, Aktiengesellschaft, Siemensstadt, near Berlin, a corporation of Germany Application March 31, 1933, Serial No. 663,764 In Germany April 2, 1932

12 Claims. (Cl. 177—352)

The invention relates to measuring apparatus serving, inter alia, for determining the flying altitude of aircraft, wherein the determination of the altitude is derived from changes in capacity or other changes in the electrical conductivity of an electrical structure, particularly a condenser, suitably arranged on the vehicle, caused by changes in the distance between the vehicle and the earth. In prior constructions of altitude measuring devices, the values of measurement are influenced by the nature of the ground over which the measurement is being effected, so that the latter is not a reliable indication of the altitude to be determined. Moreover, the prior forms of apparatus were not capable of indicating the distance of the vehicle from say the tree-tops of a forest, as can be effected according to the invention. The term "earth" or "ground surface" is intended, for the purposes of the present specification, to have a general meaning and is intended to include forests, buildings or series of buildings, expanses of water and the like.

If very high frequencies are used, as was hitherto the case, then in addition to the changes in capacity caused by changes in the flying altitude, the changes in damping and also in radiation which are associated with the changes in the nature of the ground affect the measurement, so that, as has already been mentioned above, the measuring result does not provide a good indication of the altitude to be determined.

In prior altitude measuring devices, moreover, the determination of the capacity changes caused by the changing of the flying altitude is rendered difficult by the fact that relatively very high capacities exist between the condenser plates on one hand and the body of the flying machine on the other, and therefore the capacity changes caused by variations in the flying altitude form only an extremely small fraction of the total capacity of the measuring condenser.

It is an object of the present invention to provide an apparatus for effecting such altitude measurements in which the effects caused by changes in the nature of the ground are eliminated.

A further object of the invention is to provide an apparatus for effecting such altitude measurements in which the effects of capacity between the measuring condenser plates or other measuring elements and the body of the aircraft are eliminated.

Another object of the invention is to provide a measuring apparatus by means of which the ground damping resistance can be measured in addition to the altitude.

Still another object of the invention is to provide means whereby the nature of the surface over which an aircraft is flying may be determined.

Due to the two most important features of the invention, the capacity between the plates of the measuring condenser is, so to speak, insulated as regards the altitude measurement, that is, for the altitude measurement it is firstly independent of the damping resistance of the ground entering the condenser field and secondly it is independent of the capacities between the plates of the altitude measuring condenser and the body of the vehicle.

It is possible to use these features of the invention separately, in accordance with the particular requirements, although it will generally be desirable to combine these features. Further details of the invention will be hereinafter explained in several constructional examples with reference to the drawing. In the drawing, Fig. 1 is a diagrammatic view showing a cross section of an aeroplane and its relation to the ground; Fig. 2 is a diagram of a bridge circuit formed by certain parts shown in Fig. 1; Fig. 3 is a view similar to Fig. 1, showing another embodiment of our invention; and Fig. 4 is a diagram of the circuits used in said second embodiment.

In Fig. 1, I and 2 indicate supporting surfaces and 3 the cabin of an aeroplane. 4 and 5 are the condenser plates or the condenser electrodes of the condenser serving for measuring the altitude; they are preferably arranged, as shown, underneath the supporting surfaces and insulated therefrom, it being preferable to keep them at such a distance away that the supporting capacity of the supporting surfaces I and 2 is not appreciably impaired by them. The profile of the condenser surfaces is preferably similar to that of the supporting surfaces and the area of each may amount, for instance, to 1 square meter. For aerodynamic reasons, however, it may be desirable to construct the measuring surfaces as part of the under surface of the wing, sufficiently wide margins for insulation against the metallic parts of the vehicle being provided. In the constructional example of Fig. 1, the determination of the capacity between the plates 4 and 5 is effected by using a condenser $C_n$. This condenser may comprise the plate 4 of the altitude measuring condenser; the plate 6 surrounded by the bottom of the supporting surface I, but spaced therefrom serves as the second plate. The other parts of the actual measuring circuit are accommodated, in order to obtain maximum possible screening, in a container surrounded by a metal covering and brought to a suitable potential. In an all-metal vehicle, the metal covering thereof may be used as the screen and the measuring arrangement, as shown in Fig. 1, may be arranged, for instance, in the cabin 3. In the case of vehicles of wooden or mixed construction, special metal plates in the form of wire grids or thin metal foils or metallic coatings are provided. A portion of such coating is indicated at 72 in Fig. 1.

The altitude measuring condenser $C_h$ consisting of the plates 4 and 5 and the condenser $C_n$ are connected, together with the resistances $R_1$ and $R_2$, in a bridge circuit which is fed from the current source 7 and in the diagonal branch of which, for example, a suitable indicating instrument, for instance, as indicated in Fig. 1, a telephone 9 is connected, e. g. through a transformer 8. A variable condenser $C_v$ may be connected in parallel with the resistance $R_1$. The alternating current supplied by the source 7 preferably has a wave length of at least 2000 metres.

The circuit shown in Fig. 1 is redrawn in Fig. 2 to facilitate inspection, the same reference characters being used. The chain-dotted line 10 indicates in Fig. 2 the screen which is formed, in the practical construction according to Fig. 1, by the metal parts of the vehicle itself. Since the screen 10 or, with reference to Fig. 1, the supporting surface 1 and thus also the other metal parts of the vehicle metallically connected thereto are connected to one pole of the current source 7 and the condenser plate 4 is connected to the other pole of the current source 7 the capacities existing between the condenser plate 4 and the vehicle (indicated in chain-dotted lines in Fig. 1 by $C_s$) are directly connected to the terminals of the current source 7 and thus put a load on the current source 7, but do not form part of the actual measuring circuit.

The resistances $R_1$ and $R_2$ are preferably of low resistance value, for instance of the order of magnitude of 100 to 1,000 ohms so that the capacities present between the screen 10 (or 1) and the plates 5 and 6 do not interfere with the measuring result owing to their comparatively high apparent resistance at the measuring frequency.

In order to carry out the measurement, the sliding contact 11a, which is adjustable on a resistance wire and forms the variable element between the two bridge resistances $R_1$ and $R_2$, is adjusted so that the instrument (such as 9) connected in the bridge diagonal gives a proper indication, for instance, a minimum of sound if it is an acoustic instrument. The adjustment of the sliding contact 11a then gives a clear index for the capacity component of the condenser $C_h$ and thus for the magnitude of the distance $h$ between the aeroplane and the ground. A scale allotted to the sliding contact 11a or the resistance wire can therefore be directly calibrated in altitudes. Instead of a sliding resistance, of course, any other adjustable resistance may be employed. Since, on approaching the earth, the change in capacity increases with increasing rapidity, for instance, at a very high altitude it increases approximately quadratically, it is desirable to graduate the resistance serving for the adjustment by which the capacity component is balanced, correspondingly, for instance according to an exponential function.

In certain circumstances, it may be desirable to determine also the specific conductivity of the ground in order that in the event for instance of an intended landing the nature of the ground surface below the vehicle may be inferred. The specific conductivity of the ground is a function of the ratio of the change in capacity and the change in conductivity between the plates 4 and 5. It can be determined with the circuit shown in Figs. 1 and 2 by adjusting the condenser $C_v$ until a second current minimum is obtained in the diagonal branch of the bridge circuit. The conductivity of the ground can be ascertained from the adjustments of the resistance $R_1$ and the condenser $C_v$. The ground may be considered as a resistance to be included as a factor in the measurement in those cases where it is desirable to have some clue to the nature of the ground. According to such nature, the specific conductivity of the ground will vary. If the ground resistance is included as a factor, the total resistance between the condenser plates 4, 5 will be the sum of the ground resistance and of the impedance of said condenser. The specific conductivity of the ground will then be a function of the variations in the capacity and the resistance between the condenser plates 4, 5. When the craft is at high altitudes, the capacity of the condenser is small and its impedance great, so that the ground resistance will be a negligible factor. Conditions are however reversed at low altitudes, that is, the capacity is then great and the impedance small. Therefore the ground resistance becomes an appreciable factor when the craft is at a short distance from the ground. As stated in the introductory part of this specification, when we speak of the "ground" or the "ground surface", we mean that portion of the surface which is nearest to the craft; in the case of a forest, "ground" will mean the tree-tops, in the case of towns or buildings, "ground" will mean the roofs or upper portions of the buildings, etc. In cases where the ground resistance is to be determined so as to give an indication of the nature of the ground, the condenser $C_v$ is adjusted, as stated above, until a second current minimum is obtained in the diagonal branch of the bridge circuit. By then determining the ratio of the condenser $C_v$ to the resistances $R_1$ and $R_2$, we are able to deduce the ratio of ground resistance and capacity in these branches, and in this manner we obtain a measure of the specific conductivity of the ground.

As has been mentioned above, it is essential for the altitude measurement, that is, when determining the capacity component of the altitude measuring condenser, that the wave length of the current employed for the measurement should be several times the maximum value of the altitudes falling within the working range. If the working range extends, say, from zero to 200 m. the frequencies of say 5,000 to 50,000 cycles may be used in view of the required voltage. If necessary, it is possible to use frequencies down to 500 cycles or even less. However, difficulties are then encountered in obtaining current of the required intensity in the measuring circuit or in producing the high voltage necessary therefor. If 10,000 cycles are employed, voltages of 10,000 to 50,000 volts may be necessary in practice if amplifiers are dispensed with. Even when using amplifiers the measuring voltage must not have too low a value since, in view of the disturbances taking place in the vehicle (for instance, vibrations or ignition disturbances) the input must not fall too low. Preferably, voltages above 500 volts are used. The production of this voltage can be effected by means of a suitable transformer. In this case, it is possible to use as the primary source of current an alternating current generator as such, or a "generator" working on the quenched-spark principle, preferably in conjunction with filtering means for the purpose of avoiding interference with wireless reception.

In the final choice of the frequency within the range included in the scope of the invention, it will be preferable to be guided by the circumstances of the individual case and, for instance, in certain circumstances, a distinction will be made between the altitude measuring devices for aerial vehicles for use over land and those for aerial vehicles for use over water. In place of the circuit shown, any other suitable circuit may be employed, for instance, circuit arrangements such as are customary in connection with the measurement of changes in capacity or of loss angles of condensers.

Furthermore, by choosing other comparison resistances or apparent resistances, it is also possible to conform with greater or less approximation to the apparent resistances actually existing between the plates of the altitude measuring condenser. Fig. 3 shows a constructional example and Fig. 4 is the corresponding circuit diagram specially redrawn in order to facilitate inspection.

The arrangement of the plates 4 and 5 of the altitude measuring condenser, the connection of the current source 7 and the screening of the remainder of the measuring arrangement or measuring circuit within the parts 1, 2, 3 of the aeroplane is the same as in the construction according to Fig. 1 and does not require any further discussion here. The arrangement of the bridge circuit is based on the following consideration. At an infinite altitude of the vehicle above the ground, the latter has no influence on the capacity between the plates 4 and 5. Let this capacity value be represented as the basic capacity $C_o$, which is diagrammatically indicated in Fig. 3. On approaching the ground, the capacity component between the two plates 4 and 5 increases. This can now be conceived in a rough diagram such that the said basic capacity $C_o$ remains constant and an additional capacity $C_h$ caused by the approach to the ground is added thereto. The loss resistance of the ground should also be imagined to be connected in series with this additional capacity $C_h$. In Fig. 3 this is illustrated by the capacity $C_h$ and the earth resistance $R_e$ shown as concentrated.

The bridge branch connected in series with the altitude measuring condenser is constructed in accordance with the substitutional diagram explained above, which, of course, only presents a certain approximation to the real and rather complicated conditions. Therefore, as can be seen from Figs. 3 and 4, it comprises in parallel connection, on one hand, a fixed condenser $C_{on}$ and, on the other, an adjustable condenser $C_{hn}$ and a variable ohmic resistance $R_{en}$ in series therewith. In the other two branches of the bridge there are connected the fixed normal condenser $C_n$ and a variable condenser $C_v$. 10 in Fig. 4 indicates the screen which is formed in practice by the metallic parts of the vehicle and which, as can also be seen from the circuit diagram, is again connected to one pole of the current source by a suitable potential connection. In order that the variable circuit capacities may not have any disturbing effects on the bridge, the capacities $C_{on}$, $C_{hn}$ and $C_v$ must be large with respect to the former. Of course, the network $C_{on}$, $C_{hn}$, $R_{en}$ may be replaced by electrically equivalent or more complicated networks.

Before using the measuring circuit, it must first of all be adjusted. This is effected by adjusting the voltage $e$ arising in the diagonal branch of the bridge at a high altitude above the ground, to zero, by varying $C_v$, with the condenser $C_{hn}$ and the resistance $R_{en}$ cut out for which purpose a switch 40 may be provided. This adjustment of the condenser $C_v$ then remains unchanged. If the vehicle approaches the ground, then in order to carry out the altitude measurement, that is, in order to determine the capacity $C_h$ the bridge is fed with a current the frequency of which is so low according to the above-mentioned feature that the conductivity of the ground is insignificant. The bridge is then balanced (with the resistance $R_{en}$ cut out by means of a switch 41) by varying $C_{hn}$. The adjustment of the condenser $C_{hn}$ then gives an index for the altitude to be measured. The condenser $C_{hn}$ may be directly calibrated in altitudes.

If, in addition, the specific conductivity of the ground is to be determined, for which purpose it is necessary to know the magnitude of $R_e$, the bridge is preferably fed with a current having a frequency which is substantially higher than the frequency used for measuring altitude. The bridge is now again balanced for this higher frequency, by adjusting the resistance $R_{en}$. The specific conductivity of the ground is obtained from the ratio of the capacity value adjusted at $C_{hn}$ and the resistance value adjusted at $R_{en}$.

In certain circumstances, it may be preferable to energize the bridge with a current which is a mixture of both frequencies, that is, the low frequency serving for measuring altitude and the higher frequency which is used for determining the effective component. The two frequencies or the voltages $V_1$ and $V_2$ arising with these frequencies in the diagonal branch of the bridge are preferably separated from one another, as is indicated in Fig. 4, by filter circuits and passed through separate amplifiers or the like to indicating apparatus, or to effect the automatic adjustment of $C_{hn}$ and $R_{en}$.

In many cases it will be unnecessary to ascertain the conductivity of the ground. Even in this case, however, the resistance $R_{en}$ employed in the circuit according to Figs. 3 and 4 may offer the advantage that a good minimum indication may be obtained.

As has been mentioned above, the necessary voltage becomes comparatively high. This arises from the fact that capacities in the order of magnitude of 1 cm. are to be measured by the measuring arrangement with an accuracy of 1 per thousand, if altitudes of 200 m. and more are in question. If a frequency of 10,000 cycles is used for the altitude measurement, an apparent resistance of about $1.6 \cdot 10^7$ ohms corresponds to the capacity of 1 cm. If the indicating means provided in the diagonal branch of the bridge circuit has a sensitivity of $5 \cdot 10^{-7}$ ampere, that is, for instance, a telephone without an amplifier, then in order that an accuracy of 1 in a thousand may still be obtained with certainty, a current of 2 milliamperes is necessary in the bridge resistances, that is, for instance $C_h$ or $C_n$. In order that such a current may be able to flow under the conditions outlined, the measuring voltage must amount to 32,000 volts. In view of this comparatively high voltage for an aerial vehicle, it is desirable to derive the measuring current through a suitable transformer from a generator driven by a propeller, since in this case the voltage returns to zero immediately after landing. If necessary, as is indicated in Fig. 1, the voltage generating installation may be arranged within one condenser plate. The values resulting at any time from the adjustment of the bridge circuit after balancing is effected are preferably automatically transmitted by electrical or mechanical means to the instrument board provided at the pilot's position.

In the circuits above described, differential circuits i. e. bridge circuits, are used, in connection with a comparison normal and, more particularly, a condenser specially formed on the vehicle is used. This construction has the advantage that variations of the voltage of the current source used for feeding the measuring circuit and, moreover, changes in the moisture of the air and other atmospheric disturbances have substantially no effect on the measuring result. In the above described constructional examples, one plate of the altitude measuring condenser is used at the same time for forming the comparison condenser. Instead of this, of course, the comparison condenser or more generally, the electrical comparison structure may also be arranged at a different point of the vehicle.

For the sake of simplicity, "altitude measurement" has been referred to hereinbefore. However, this should be generally understood as the measurement of the distance of an aerial vehicle from fixed surfaces, for instance, the lateral distance of an aerial vehicle from a mountain wall or the like in the vicinity. In order to render such measurements possible, it is only necessary to provide a suitable arrangement of the electrical structures or the condenser plates, so that changes in the lateral distance affect the apparent conductivity of the particular condenser or the like. If necessary, the subject of the invention may also be used for determining the distance away of aerial vehicles in the vicinity. In this case, no quantitative measurement is generally necessary. On the contrary, it will usually be sufficient if it is indicated by the measuring arrangement that the distance away of aerial vehicles or the like in the vicinity is less than a certain amount.

What we claim is:

1. Apparatus in an aircraft having metallic parts, for determining the distance of said craft from the ground or other objects, comprising a bridge circuit having four arms defining four junctions, a conducting body connected to the junction of two of said arms, two additional conducting bodies each connected in one of said two arms and forming condensers in conjunction with the first mentioned conducting body, a variable impedance connected in the part of the bridge circuit across the junctions adjacent said one junction, the fourth junction being connected to a point along said impedance, a source of alternating electric potential having its terminals connected in the said first and fourth junctions, and means connecting the said metallic parts of the craft with said fourth junction.

2. Apparatus in an aircraft having metallic parts, for determining the distance of said craft from the ground or other objects, comprising a bridge circuit having four arms defining four junctions, a conducting body connected to the junction of two of said arms, two additional conducting bodies each connected in one of said two arms and forming condensers in conjunction with the first mentioned conducting body, a variable impedance connected in the part of the bridge circuit across the junctions adjacent said one junction, the fourth junction being connected to a point along said impedance, a source of alternating electric potential having its terminals connected in the said first and fourth junctions, means connecting the said metallic parts of the craft with said fourth junction, and indicating means having its terminals connected in the two junctions adjacent said first junction.

3. Apparatus in an aircraft having metallic parts, for determining the distance of said craft from the ground or other objects, comprising a bridge circuit having four arms defining four junctions, a conducting body connected to the junction of two of said arms, two additional conducting bodies each connected in one of said two arms and forming condensers in conjunction with the first mentioned conducting body, a variable resistance connected in the other two arms of said bridge circuit, a variable capacity connected in one of said other two arms, in shunt to said variable resistance, a source of alternating electric potential having its terminals connected in the said first and fourth junctions, and means connecting the said metallic parts of the craft with said fourth junction.

4. Apparatus in an aircraft having metallic parts, for determining the distance of said craft from the ground or other objects, comprising a bridge circuit having four arms defining four junctions, a conducting body connected to the junction of two of said arms, two additional conducting bodies each connected in one of said two arms and forming condensers in conjunction with the first mentioned conducting body, a variable capacity and a variable resistance connected in series in one of the other two arms of said bridge circuit, another capacity connected in shunt with said series-connected elements, a source of alternating electric potential having its terminals connected in the said first and fourth junctions, and means connecting the said metallic parts of the craft with said fourth junction.

5. Apparatus in an aircraft having metallic parts, for determining the distance of said craft from the ground or other objects, comprising a bridge circuit having four arms defining four junctions, a conducting body connected to the junction of two of said arms, two additional conducting bodies each connected in one of said two arms and forming condensers in conjunction with the first mentioned conducting body, a variable capacity and a variable resistance connected in series in one of the other two arms of said bridge circuit, another capacity connected in shunt with said series-connected elements, another variable capacity connected in the fourth arm of said bridge circuit, a source of alternating electric potential having its terminals connected in the said first and fourth junctions, and means connecting the said metallic parts of the craft with said fourth junction.

6. Apparatus in an aircraft having metallic parts, for determining the distance of said craft from the ground or other objects, comprising two conducting bodies arranged on said craft in such relation as to form a condenser the capacity of which is adapted to be affected by the ground or other object the distance of which from the craft is to be determined, whenever there is a change in such distance, means for determining the capacity of said condenser, and means for substantially reducing the influence which is exerted on the measurement by the capacity existing between the said conducting bodies and the metallic parts of the craft.

7. Apparatus in an aircraft having metallic parts, for determining the distance of said craft from the ground or other objects, comprising two conducting bodies arranged on said craft in such relation as to form a condenser the capacity of which is adapted to be affected by the ground or other object the distance of which from the craft is to be determined, whenever there is a change in such distance, a source of electricity means, connected with said source, for determining the capacity of said condenser, and means for substantially reducing the influence exerted on the measurement by the capacity existing between the said conducting bodies and the metallic parts of the craft, said last-mentioned means including a capacity connected with said metallic parts and with said source of electricity but separate from the above mentioned means for determining the capacity of said condenser.

8. Apparatus in an aircraft having metallic parts, for determining the distance of said craft from the ground or other objects, comprising two conducting bodies arranged on said craft in such relation as to form a condenser the capacity of which is adapted to be affected by the ground or other object the distance of which from the craft is to be determined, whenever there is a change in such distance, a source of electricity, a capacity connected with said metallic parts and having its terminals connected with the terminals of said source, and a circuit connected with the terminals of said source in shunt with said last-mentioned capacity, said circuit including said condenser and also including means for determining the capacity of said condenser.

9. Apparatus in an aircraft having metallic parts, for determining the distance of said craft from the ground or other objects, comprising a condenser on said craft, the capacity of said condenser being affected by the ground or other object the distance of which from the craft is to be determined, whenever there is a change in such distance, means for determining the capacity of said condenser, and means for substantially reducing the influence which is exerted on the measurement by the capacity existing between said condenser and the metallic parts of the craft.

10. In apparatus for determining the altitude of an aircraft having metallic parts, the combination of an electrostatic condenser carried on the craft and the capacity of which is affected by the altitude of the craft, means for impressing electrical oscillations upon the condenser, means for indicating the changes in the capacity of the condenser produced by changes in altitude, and means for substantially reducing the influence which is exerted on said indicating means by the capacity existing between the condenser and the metallic parts of the aircraft.

11. In apparatus for determining the distance between two objects, the combination of an electrical circuit arrangement including means for generating electrical oscillations, means carried by one of said objects and associated with said circuit arrangement and providing a capacitance which varies with changes in the distance between the two objects, means included in said circuit arrangement for indicating said changes in capacity due to changes in altitude, and means for substantially reducing the effect of stray capacities on the indicating means so that the latter indicates only the changes in capacity due to changes in the distance between the objects.

12. The method of determining the true altitude of an aircraft above the ground, which method comprises forming on the aircraft an electrical condenser having a dielectric which is constituted by the atmosphere between the aircraft and the ground, whereby said condenser is subject to changes in capacity with changes in altitude, measuring the changes in capacity of said condenser, and substantially reducing the effect of stray capacities on the measurement whereby the measurement is a true indication of the altitude of the aircraft above the ground.

FRITZ FISCHER.
LUDWIG RELLSTAB.